(12) United States Patent
Kasha

(10) Patent No.: US 7,230,778 B2
(45) Date of Patent: Jun. 12, 2007

(54) SLIDING TRACK FOR OPTICAL APPARATUS

(75) Inventor: Vladislav Kasha, Rochester, NY (US)

(73) Assignee: Melles, Griot, Inc, Rochester, NY (US)

( * ) Notice: Subject to any disclaimer, the term of this patent is extended or adjusted under 35 U.S.C. 154(b) by 0 days.

(21) Appl. No.: 11/244,474

(22) Filed: Oct. 6, 2005

(65) Prior Publication Data

US 2006/0077576 A1 Apr. 13, 2006

Related U.S. Application Data

(60) Provisional application No. 60/616,736, filed on Oct. 7, 2004.

(51) Int. Cl.
  *G02B 7/02* (2006.01)
(52) U.S. Cl. .................. 359/819; 359/822; 359/823; 359/824
(58) Field of Classification Search ................ 359/819, 359/811, 813, 822, 823, 826
See application file for complete search history.

(56) References Cited

U.S. PATENT DOCUMENTS

| | | |
|---|---|---|
| 3,060,801 A | 10/1962 | Boughton et al. |
| 3,185,029 A | 5/1965 | Peck et al. |
| 3,405,991 A | 10/1968 | Seedhouse |
| 3,510,202 A | 5/1970 | Boughton |
| 4,008,480 A | 2/1977 | Szabo |
| 4,048,641 A | 9/1977 | Cieplik et al. |
| 4,397,544 A | 8/1983 | Yajima et al. |
| 4,650,296 A | 3/1987 | Tsuchiya |
| 4,690,519 A | 9/1987 | Clark et al. |
| 5,016,993 A | 5/1991 | Akitake |
| 5,182,481 A | 1/1993 | Sakamoto |
| 5,231,473 A * | 7/1993 | Kawamura et al. .......... 359/694 |
| 5,515,210 A | 5/1996 | Devenyi |
| 5,675,442 A | 10/1997 | Parks |
| 6,225,941 B1 * | 5/2001 | Gogineni et al. ............. 342/22 |
| 6,507,705 B1 | 1/2003 | Kasha |
| 7,173,772 B2 * | 2/2007 | Masuda ...................... 359/696 |

* cited by examiner

*Primary Examiner*—Alicia Harrington
*Assistant Examiner*—Brandi Thomas
(74) *Attorney, Agent, or Firm*—Shlesinger & Fitzsimmons

(57) ABSTRACT

This sliding track for optical apparatus provides a system for mounting and easily moving lens cells and/or other portions of an optical apparatus that are co-axially arranged with respect to an optical axis of the apparatus along said optical axis while maintaining axial alignment. It does so by positioning the lens cells on two linear precision rods placed parallel to the optical axis of the lens cells and optical apparatus. Low-friction plastic inserts are mounted to or in the moving lens cells so that they support said cells on the parallel rods and provide a low friction sliding contact that does not require lubrication. Low-friction plastic holding pads are mounted via springs to the moving cells and are biased against the opposite side of the parallel rods so as to hold the moving cells firmly in position against the parallel rods, but without hampering the cells from sliding smoothly along the rods. The outer diameter of the widest point of each lens cell is equal, with centrally located coaxial lens or lenses. Thus, when each lens cell is placed in position against the two parallel rods, their respective lenses are coaxial.

20 Claims, 4 Drawing Sheets

SLIDING TRACK FOR OPTICAL APPARATUS

REFERENCE TO RELATED APPLICATIONS

This application claims an invention which was disclosed in Provisional Application No. 60/616,736, filed Oct. 7, 2004, entitled "Sliding Track for Optical Apparatus". The benefit under 35 USC §119(e) of the United States provisional application is hereby claimed, and the aforementioned application is hereby incorporated herein by reference.

BACKGROUND OF THE INVENTION

1. Field of the Invention

My invention pertains to the field of optical apparatus. More particularly, the invention pertains to means for simply and easily achieving a coaxial alignment of lens cells on an optical apparatus of a device, and for smoothly and easily moving lens cells and/or other portions of an optical apparatus along said optical axis while maintaining coaxial alignment.

2. Description of Related Art

There are numerous systems for alignment and aligned movement of portions of an optical apparatus along the optical axis of the apparatus. Some examples of systems related to this purpose can be seen in the following U.S. patents:

- U.S. Pat. No. 3,060,801 issued to Boughton in 1962 for a "Stereomicroscope Variable Focus Mounting."
- U.S. Pat. No. 3,185,029 issued to Peck et al. in 1965 for a "Linear Zoom Optical System."
- U.S. Pat. No. 3,405,991 issued to Seedhouse in 1968 for a "Mounting Mechanism for Zoom Type of Optical Systems for a Stereomicroscope."
- U.S. Pat. No. 3,510,202 issued to Boughton in 1970 for a "Lens Carriage for Continuously Variable Magnification Stereomicroscopes."
- U.S. Pat. No. 4,008,480 issued to Szabo in 1977 for a "Photocomposition Escapement Drive System."
- U.S. Pat. No. 4,397,544 issued to Yajima et al. in 1983 for an "Optical Apparatus for Changing Magnification or Reduction Rates."
- U.S. Pat. No. 4,650,296 issued to Tsuchiya in 1987 for a "Magnification Changing Mechanism of a Microscope."
- U.S. Pat. No. 4,690,519 issued to Clark et al. in 1987 for a "Zoom Microscope Having a Crank and Linkage System."
- U.S. Pat. No. 5,016,993 issued to Akitake in 1991 for a "Zoom Mechanism for Zoom Lens."
- U.S. Pat. No. 5,231,473 issued to Kawamura et al. in 1993 for a "Lens Barrel."
- U.S. Pat. No. 5,515,210 issued to Devenyi in 1996 for a "Permanent Magnetic Suspension with Roller Guides."
- U.S. Pat. No. 5,675,442 issued to Parks in 1997 for a "Microscope Lens Guide System."
- U.S. Pat. No. 6,507,705 issued to Kaxha in 2003 for a "Guiding Mechanism for Moving Parts in Zoom Lens."

However, there is a continuing need for robust systems that provide means for easily mounting and moving lens cells and/or other portions of an optical apparatus along an optical axis.

SUMMARY OF THE INVENTION

My invention provides a robust and simple system for mounting and easily move lens cells and/or other portions of an optical apparatus that are co-axially arranged with respect to an optical axis of the apparatus along said optical axis while maintaining axial alignment. It does so by positioning the lens cells on two linear precision rods placed parallel to the optical axis of the lens cells and optical apparatus.

Low-friction plastic inserts are mounted to/in the moving lens cells so that they support said cells on the parallel rods and provide a low friction sliding contact that does not require lubrication. Further, I provide low-friction plastic holding pads that are mounted via springs to the moving cells. The holding pads are biased against the opposite side of the parallel rods by said springs and thereby serve to hold the moving cells firmly in position against the parallel rods, but without hampering the cells from sliding smoothly along the rods.

In addition, the outer diameter of the widest point of each lens cell is equal, with centrally located coaxial lens or lenses. Thus, when each lens cell is placed in position against the two parallel rods, their respective lenses are coaxial. The two parallel rods of my invention also provide a simple means for co-axially aligning the lens cells of the optical system.

DETAILED DESCRIPTION OF THE INVENTION

Figure 1:
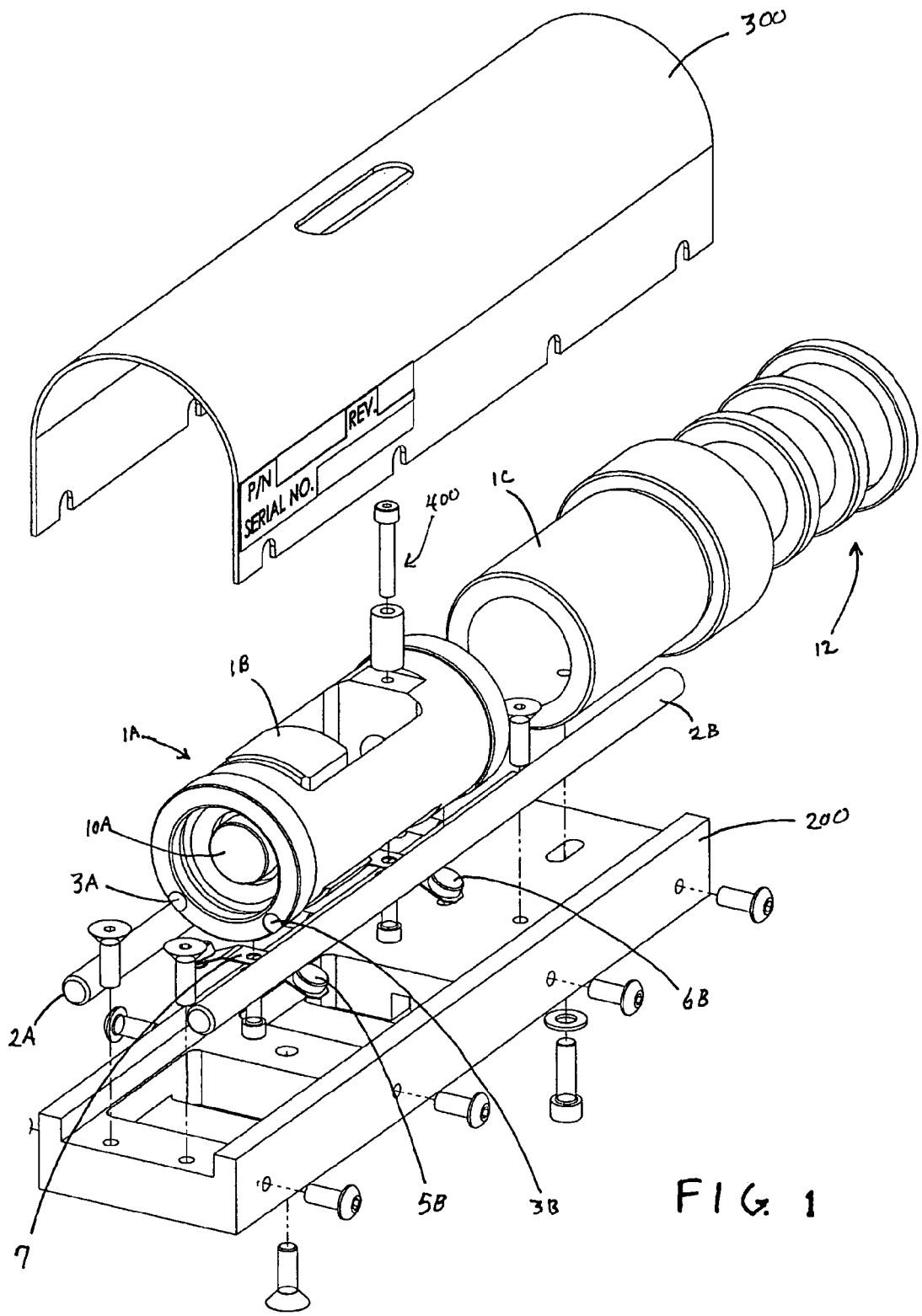
FIG. 1 provides a first exploded perspective view of a preferred embodiment of my invention.
Figure 2:
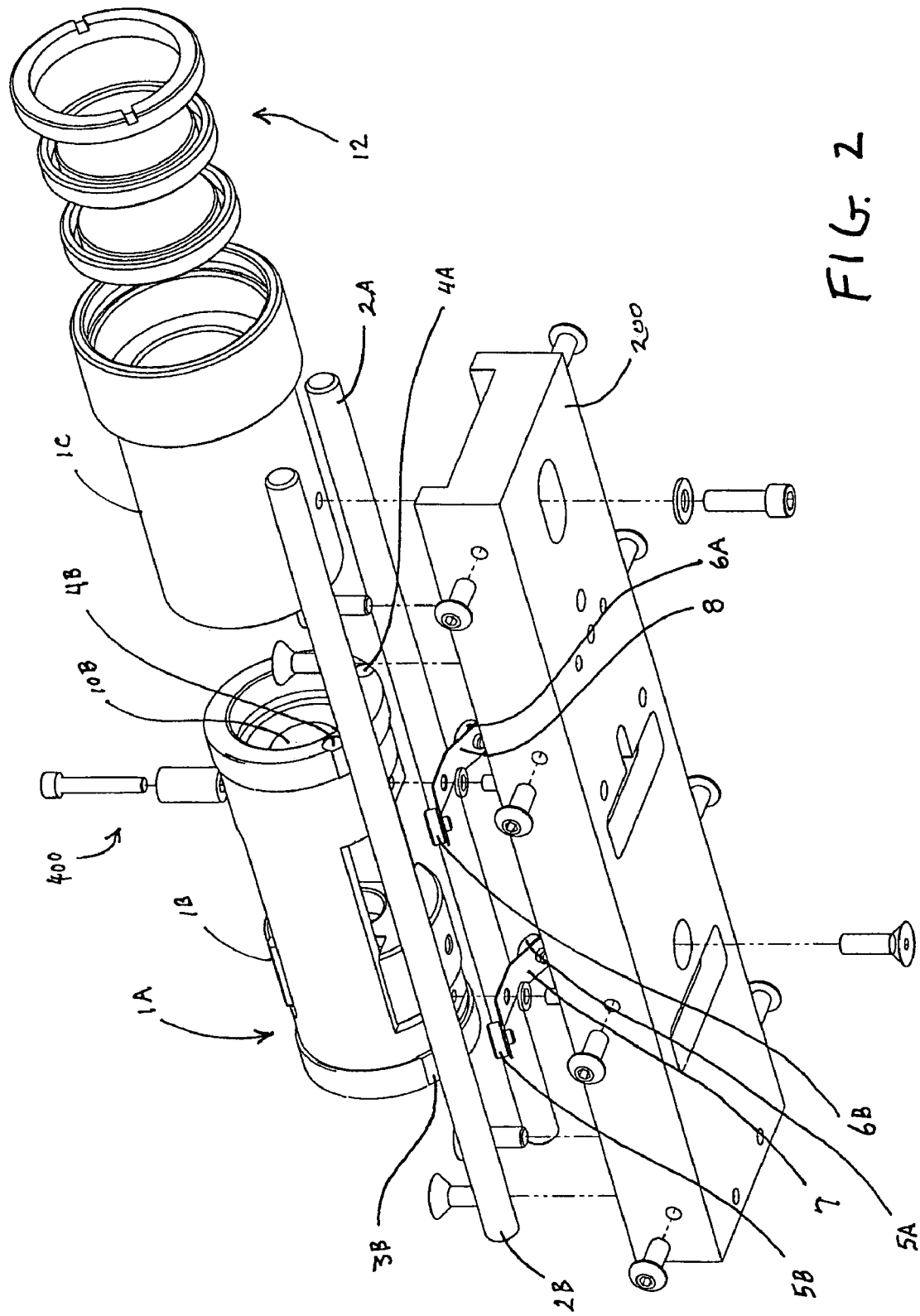
FIG. 2 provides a second exploded perspective view of a preferred embodiment my invention.
Figure 3:
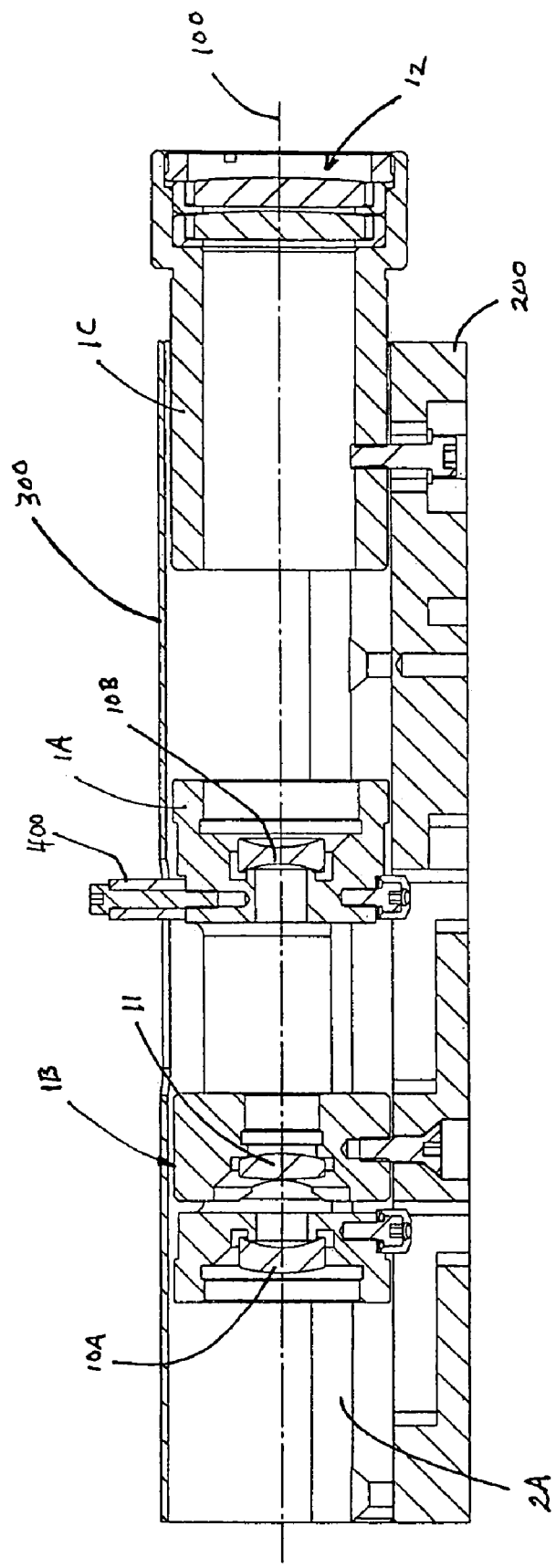
FIG. 3 provides a side cross-sectional view of a preferred embodiment my invention.
Figure 4:
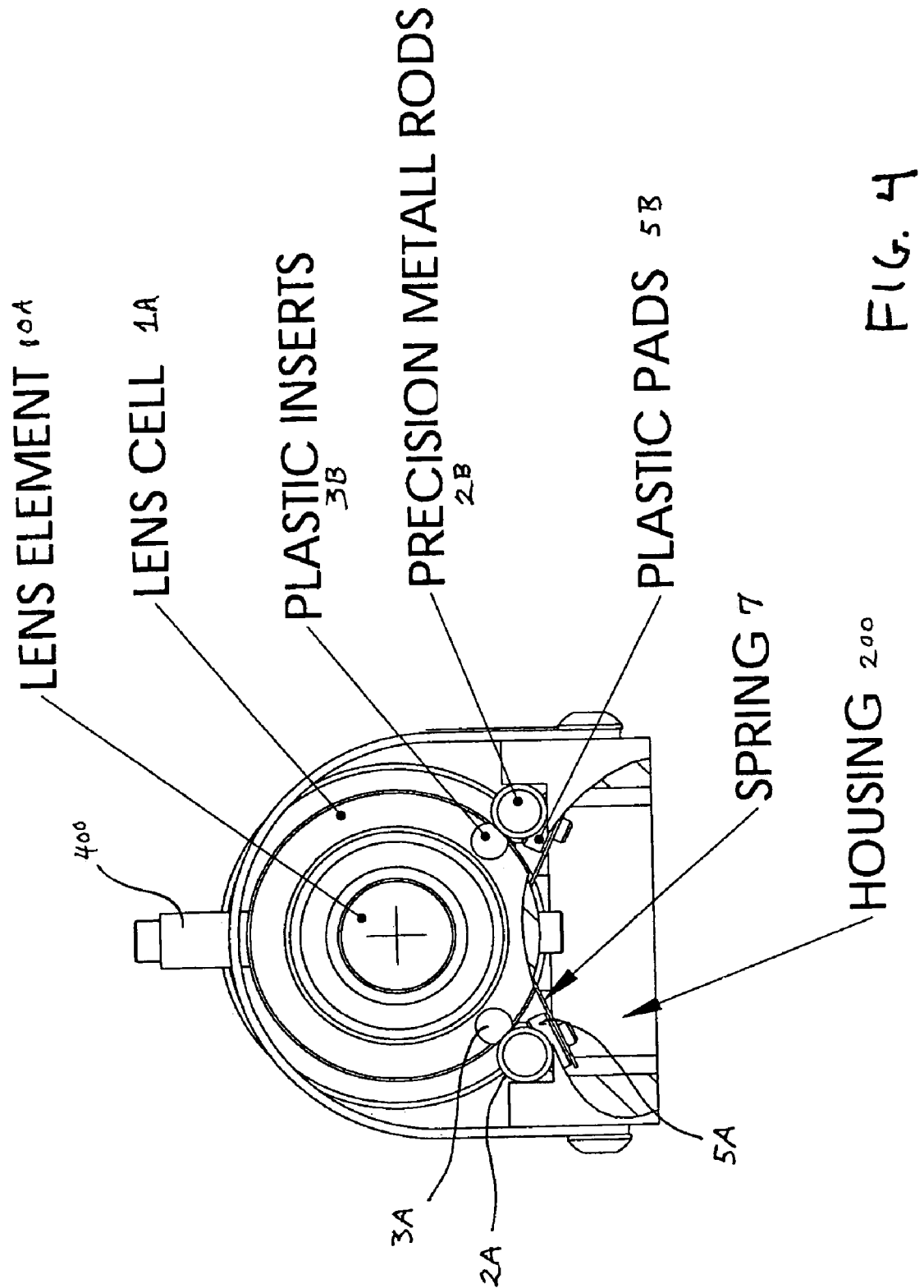
FIG. 4 provides an end view of a preferred embodiment my invention.

As will be noted from review of the drawing figures, the preferred embodiment of my invention is characterized by the positioning of moving lens holders (cell 1A) and stationary lens holders (cells 1B and 1C) on two linear precision members or rods 2A and 2B parallel to the optical axis 100 of said lens cells. Rigid precision rods 2A and 2B are positioned and held in place by rigid connection to a support member (base housing 200); with a slotted cover 300 provided to protect the entire assembly. A zoom lens actuator 400 extends through the slot in cover 300 to allow operation of moving cell 1A, the "zoom lens" of the system.

The outer diameter of each of said cells 1A, 1B and 1C adjacent and abutting rods 2A and 2B is equal, with the lens elements therein 10A, 10B, 11, and 12 being concentrically arranged in each cell. Thus, the two parallel rods 2A and 2B provide not just means for sliding the moving lens cell 1A, but means for co-axially aligning moving lens cell 1A (the zoom element of the system), fixed lens cell 1B, and fixed lens cell 1C (the focus adjustment element of the system). As the lens cells 1A, 1B and 1C are co-axially aligned on the optical axis 100, their respective centrally located axial lenses, 10A and 10B, 11 and 12 are co-axially aligned along the optical axis 100.

My invention is further characterized by the use of low-friction elements or inserts 3A, 3B, and 4A, 4B mounted to moving cell 1A so that said inserts 3A, 3B, 4A, and 4B support moving cell 1A on said parallel precision rods 2A and 2B. Further, it is characterized by the presence of spring mounted low-friction holding elements or pads 5A, 5B, 6A, and 6B. These are mounted via biasing elements (springs 7 and 8) to moving cell 1A so as to bear on the opposite side of parallel rods 2A, 2B and to thereby hold moving cell 1A firmly, but slidably in place on parallel rods 2A and 2B.

As will be noted, inserts 3A, 3B, 4A and 4B are inset into moving cell 1A and have outer/exposed surfaces (which rest on rods 2A and 2B) that have a curvature matching the curvature of the outer perimeter (or outer diameter) of moving lens cell 1A. Thus, they do not detract from the simplified axial alignment method allowed by my invention (and described above).

All of the low-friction inserts and pads used in my invention are, preferably, produced from a very low friction, relatively non-deformable material such as the plastic TORLON®. This plastic has good temperature and chemical resistance and is designed for use in bearings and other high wear parts. Thus, it can easily stand up to the level and types of use typical of an optical system of this type. Overall, it forms a robust and low-wear component for use in an optical system that is simply and easily formed, easy to use, easy to assemble, and easy to maintain in axial alignment.

As will be observed from the foregoing, my invention is most generally typified by the following:

1) All lens cells (moving and not moving) 1A, 1B and 1C are located directly on two parallel precision rods 2A and 2B, with the optical axis 100 of the system being determined by the outer diameter of the lens cells 1A, 1B and 1C, thereby providing precision positioning of all elements of the zoom system relative to each other.

2) Low friction plastic inserts 3A, 3B, 4A and 4B are inset into the moving lens cell 1A (at the contact points between the moving cell 1A and the rods 2A and 2B) that provide low friction sliding along the two rods 2A and 2B without any lubrication.

More specifically, it will be observed that my invention is typified by:

1) A moving lens cell 1A that slides on top of two precision rods 2A and 2B. The outermost radius of the moving lens cell 1A needs to be controlled very well in terms of roundness and diameter tolerance. After a lens cell 1A, 1B or 1C is installed, the outermost radius (or effective radius) of the cell, which contacts rods 2A and 2B will determine the optical axis 100 of its lens(es).

2) Low friction plastic inserts 3A, 3B, 4A and 4B are inset into moving lens cell 1A only where the contact (tangential) points are located between moving cell 1A and precision rods 2A and 2B. Inserts 3A, 3B, 4A and 4B reduce friction and avoid direct contact between metal parts in order to increase the life time of the system 3) Precision metal rods 2A and 2B support all lens cells 1A, 1B and 1C of the system. Rods 2A and 2B need to be straight and parallel to each other in order to control orientation and motion of said lens cells. Diameters of the rods 2A and 2B are, however, not important. Both rods 2A and 2B attached to the housing 200. This housing provides and maintains the parallel position of the rods 2A and 2B.

4) Springs 7 and 8 pull moving cell 1A against precision rods 2A and 2B and prevent its axial rotation.

5) Plastic pads 5A, 5B, 6A and 6B are attached to the ends of springs 7 and 8 to avoid direct contact between springs 7 and 8 and rods 2A and 2B in order to reduce friction and increase the life time of the system However, numerous variations are possible without exceeding the ambit of the inventive concept described above. Accordingly, it is to be understood that the embodiments of the invention herein described are merely illustrative of the application of the principles of the invention. Reference herein to details of the illustrated embodiments is not intended to limit the scope of the invention claimed.

What is claimed is:

1. A sliding track for optical apparatus, comprising:
   a) at least two parallel linear members in spaced relationship;
   b) at least one slidable lens holder having low friction elements mounted thereto, said lens holder being slidably mounted to said parallel linear members via said low friction elements;
   c) at least one non-slidable lens holder;
   d) wherein each lens holder has at least one lens with an optical axis, and lens axes of at least two lens holders are coaxial and parallel to said linear members.

2. A sliding track for optical apparatus as described in claim 1, further comprising a support member for holding said parallel linear members in spaced relationship.

3. A sliding track for optical apparatus as described in claim 1, wherein a slidable lens holder includes biasing elements for holding said slidable lens holder in sliding contact with said parallel linear members, said biasing elements contacting said linear members via low friction elements.

4. A sliding track for optical apparatus as described in claim 1, wherein said low friction elements are comprised of low friction relatively non-deformable plastic.

5. A sliding track for optical apparatus as described in claim 4, wherein said plastic is Torlon (R).

6. A sliding track for optical apparatus as described in claim 1, wherein said non-slidable lens holder is affixed to said parallel linear members.

7. A sliding track for optical apparatus as described in claim 1, wherein lens holders have a substantially cylindrical exterior with identical exterior radii and central axes coaxial with said optical axes.

8. A sliding track for optical apparatus as described in claim 7, wherein said low friction elements are inset into said at least one slidable lens holder and do not change the effective radius thereof.

9. A sliding track for optical apparatus, comprising:
   a) at least two parallel linear members;
   b) a support member holding said parallel linear members in spaced relationship;
   c) at least one slidable lens holder having low friction elements mounted thereto, said lens holder slidably resting via said connected low friction elements on said parallel linear members;
   d) at least one non-slidable lens holder; and
   e) wherein each lens holder has at least one lens with an optical axis, and lens axes of at least two lens holders are coaxial and parallel to said linear members.

10. A sliding track for optical apparatus as described in claim 9, wherein a slidable lens holder includes biasing elements for holding said slidable lens holder in sliding contact with said parallel linear members, said biasing elements contacting said linear members via low friction elements.

11. A sliding track for optical apparatus as described in claim 9, wherein said low friction elements are comprised of low friction relatively non-deformable plastic.

12. A sliding track for optical apparatus as described in claim 11, wherein said plastic is Torlon (R).

13. A sliding track for optical apparatus as described in claim 9, wherein said non-slidable lens holder is affixed to said parallel linear members.

14. A sliding track for optical apparatus as described in claim 9, wherein lens holders have a substantially cylindrical exterior with identical exterior radii and central axes coaxial with said optical axes.

15. A sliding track for optical apparatus as described in claim 14, wherein said low friction elements are inset into said at least one slidable lens holder and do not change the effective radius thereof.

16. A sliding track for optical apparatus, comprising:
a) at least two parallel linear members;
b) a support member beneath said parallel linear members holding said parallel linear members in spaced relationship;
c) at least one slidable lens holder having low friction elements formed from low friction relatively non-deformable plastic mounted thereto, said lens holder slidably resting via said connected low friction elements on said parallel linear members;
d) at least one non-slidable lens holder; and
e) wherein each lens holders has at least one lens with an optical axis, and lens axes of at least two lens holders are coaxial and parallel to said linear members.

17. A sliding track for optical apparatus as described in claim 16, further comprising biasing elements for holding said at least one slidable lens cell in sliding contact with said parallel linear members, said biasing elements contacting said linear members via low friction elements.

18. A sliding track for optical apparatus as described in claim 17, wherein said at least one non-slidable lens holder is affixed to said parallel linear members.

19. A sliding track for optical apparatus as described in claim 18, wherein lens holders have a substantially cylindrical exterior with identical exterior radii and central axes coaxial with said optical axes.

20. A sliding track for optical apparatus as described in claim 19, wherein said low friction elements are inset into said at least one slidable lens holder and do not change the effective radius thereof.

* * * * *